Sept. 4, 1962   J. WIDMER   3,052,084
BALANCE-WHEEL FOR TIMEPIECES
Filed Dec. 3, 1958
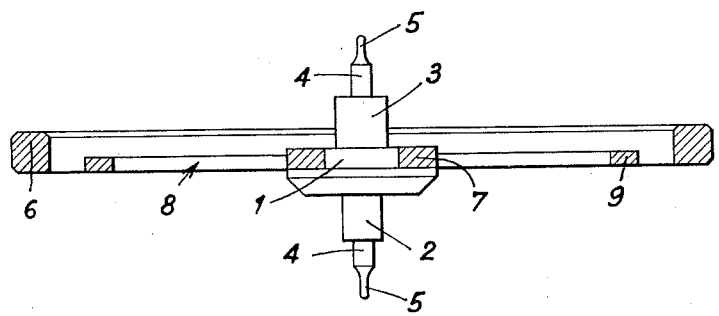
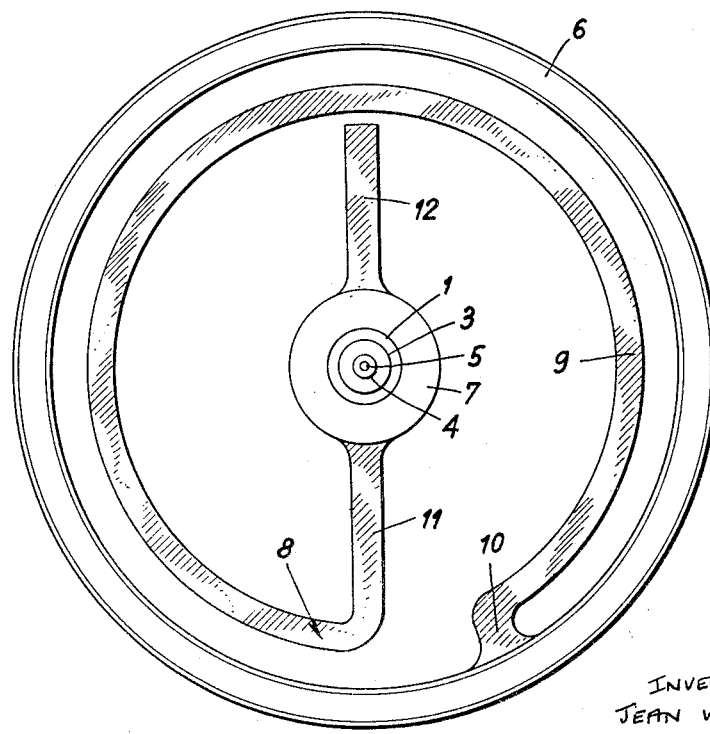
INVENTOR:
JEAN WIDMER
BY MICHAEL S. STRIKER
ATTORNEY

United States Patent Office 3,052,084
Patented Sept. 4, 1962

3,052,084
BALANCE-WHEEL FOR TIMEPIECES
Jean Widmer, Bretin 61, Courtelary, Switzerland
Filed Dec. 3, 1958, Ser. No. 777,974
Claims priority, application Switzerland Feb. 3, 1958
3 Claims. (Cl. 58—107)

This invention relates to balance-wheels for timepieces and it is an object thereof to make a balance-wheel for timepieces in which the pivots of the balance staff are protected against axial and radial impacts without using shock absorbing pivot bearings with movable elements.

Balance-wheels of this type have, however, already been proposed in the art. Most of these known balance-wheels have, fixed onto the balance staff, a member comprising an outer heavy ring substantially determining the moment of inertia of the balance-wheel, an inner ring fixed on a bearing surface of the balance staff, and two symmetrical resilient arms having their ends connected to the inner and to the outer rings, respectively. In the known balance-wheels the elasticity of said arms is ensured either by cutouts provided in or by an S-shape or a spiral form of said resilient arms.

The balance-wheels of this type have, however, the drawback that said resilient arms do not yield to the same extent in every direction upon a predetermined impact. The two arms of the known balance-wheels do thus not afford a satisfactory protection to the pivots against every radial impact. A further drawback of the known balance-wheels resides in the fact that exactly centering the heavy ring of the balance-wheel is a very delicate and toilsome operation.

It is therefore another object of the invention to use a one-piece member consisting of an outer annular heavy ring substantially determining the moment of inertia of the balance-wheel; an inner small ring concentric to said outer ring and forming a hub portion for securing said one-piece member on to the balance staff, and a single resilient arm constituting the sole means interconnecting said rings.

Still further objects of the invention will become apparent in the course of the following description.

One embodiment of the balance-wheel according to the invention is represented diagrammatically and by way of example in the annexed drawings.

In the drawings:

FIG. 1 is a cross-sectional view of said balance-wheel, and

FIG. 2 is a plane view thereof.

The balance-wheel represented comprises a usual staff formed with: a bearing surface 1 in its central portion, on which the heavy part of the balance-wheel is fixed; a bearing surface 2 for the roller carrying the impulse pin (not shown); a bearing surface 3 for the hair-spring collet (not shown), and two end parts 4 carrying pivots 5 for journalling the balance-wheel in a pair of usual bearings with fixed pierced members.

The heavy part of the balance-wheel, which is fixed on to the bearing surface 1 of the balance staff, consists of a one-piece member comprising: an outer circular great and heavy ring 6 coaxial to the balance staff, said ring 6 substantially determining the moment of inertia of the balance-wheel; an inner smaller circular ring 7 located in the plane of ring 6 and being concentric thereto, said inner ring constituting the hub portion of said one-piece member and being engaged on the bearing surface 1 of the balance staff, whereon said inner ring 7 is retained either by force fit or by riveting; and a resilient arm 8 the ends of which are attached each to one of said rings, said arm 8 constituting the sole means interconnecting said rings to one another. This arm 8 is composed of a circular portion 9 and two radial portions 10 and 11. The circular portion 9 is located near the outer ring 6 concentric thereto and consequently to ring 7 and it extends around the balance staff through an angle somewhat smaller than 360° so as to form a gap between both its ends. The portion 9 is connected, on the one hand, to ring 6 by the radial portion 10 extending from one end of portion 9 to one point of ring 6, and, on the other hand, to ring 7 by the radial portion 11 extending from the other end of portion 9 to a point of ring 7.

To keep the center of gravity of the balance-wheel on the axis defined by both pivots 5, the weight in excess on one side of the balance staff due to the radial portions 10 and 11 must obviously be compensated. This is ensured partly by the gap formed between both ends of the circular portion 9 and located on the same side of the balance staff as the radial portions 10, 11, and partly by a counterbalancing radial arm 12 located on the opposite side of the balance staff and extending freely from ring 7 to a point near the circular portion 9 of arm 8.

The distance between the free end of arm 12 and this circular portion 9, as well as the distance between portion 9 and ring 6 are chosen so that the circular portion 9 will be deformed without coming in contact neither with arm 12 nor with ring 6 upon an impact causing a transversal displacement of ring 6 with respect to the balance staff. Since arm 12 is therefore somewhat shorter than the radial portion 11 of arm 8, it cannot exactly counterbalance said radial portion unless it is made wider than portion 11. Arm 12 and portion 11 may, however, have the same width as shown in the drawings, wherein the weight difference between arm 12 and portion 11 is compensated by the gap of the circular portion 9 of arm 8, said gap counterbalancing in addition the radial portion 10 of arm 8.

The heavy one-piece member of the balance-wheel disclosed can be manufactured with a great precision by lathe-turning first a full disk out of a bar, said disk being provided with a thick peripheral portion having already the form of the outer heavy ring 6, and by cutting out thereafter the thin part of said disk so as to form the resilient arm 8, the counterbalancing arm 12 and the inner ring 7.

The balance-wheel disclosed can work without the usual peripheral screws. To poise it, depressions or recesses may be provided in the outer heavy ring 6.

The absence of peripheral projecting screws and the fact that the most important portion of the resilient arm 8 connecting both rings 6, 7 to one another is coaxial to the rotating axis of the balance-wheel produce the advantageous result that the air opposes a minimal resistance to the rotary movements of the balance-wheel. Moreover, the fact that the circular portion 9 of resilient arm 8 is located as close as possible to the outer ring 6 involves an increase of the moment of inertia of the balance-wheel, which has, as well known in the art, a favorable effect on the regulating properties of the balance-wheel.

Experiments made with the balance-wheel disclosed have shown that impacts cause the ring 6 to move with respect to the balance staff while deforming the resilient arm 8, but without causing any damage to the pivots 5 and without causing any permanent deformation of arm 8. The ring 6 can be displaced from its normal position through a path of more than .04″ in either direction without causing any permanent deformation of arm 8. However, to avoid excessive displacements of ring 6 with respect to the balance staff, during which the hair spring (not shown) could be injured, the frame of the timepiece incorporating the balance-wheel disclosed can easily be provided with abutting means arranged so as to limit the displacements of ring 6, said abutting means comprising for instance pins secured to the base-place of the timepiece movement for limiting the displacements of ring 6 in the directions perpendicular to the balance staff, and shoulders or rims on the base-place and on the bridges to limit the axial displacements of ring 6.

Said experiments have also shown that the regulating properties of the balance-wheel disclosed are excellent since the resilient arm 8 returns ring 6 immediately to its original normal position practically without prejudicial oscillation for the regulating function of the balance-wheel.

A centering error of ring 6 with respect to the balance staff can be corrected very easily by deforming the resilient arm 8 in an appropriate manner for instance by means of tweezers.

Various changes in the shape, sizes and arrangement of parts, within the scope of the appended claims will appear obvious to those skilled in the art.

I claim:
1. A balance-wheel for timepieces comprising a balance staff and a one-piece member with a great moment of inertia, said balance staff having a pair of thin pivots at its ends to journal the staff in a corresponding pair of fixed pierced members and said staff having a bearing surface in its center portion, said one-piece member being composed of: an outer circular great and heavy ring substantially determining the moment of inertia of said one-piece member; an inner small circular ring located substantially in the same plane as said outer heavy ring and being concentric thereto, said inner ring constituting the hub portion of said one-piece member and being fixed on to said bearing surface of the balance staff coaxially thereto; a resilient arm between said rings to connect them to one another, said resilient arm comprising a circular portion concentric to said rings and located near said outer heavy ring and extending around said staff through an angle only slightly smaller than 360° so as to form a predetermined gap between the two ends of said circular portion, a first radial portion extending from one end of said circular portion to one point of said outer ring, and a second radial portion extending from the other end of said circular portion to one point of said inner ring, said resilient arm constituting the sole means interconnecting said rings so as to hold said outer ring normally coaxial to said staff and to permit of said outer ring moving relative to said inner ring and to said staff either in a direction parallel to said staff or in a transverse direction with respect thereto, thus absorbing the most important part of the kinetic energy imparted to said outer heavy ring by an impact and protecting said balance staff pivots; and a counterbalancing radial arm extending freely from said inner ring within the circular portion of said resilient arm, said radial arm and said gap being arranged so as to balance the eccentric weight of both radial portions of said resilient arm.

2. For use in a timepiece, a one piece balance wheel composed of an annular outer wheel portion having an axis of turning and a predetermined peripheral length; an annular hub portion of substantially smaller peripheral length than said predetermined peripheral length and arranged coaxially and substantially in the same plane as said annular outer wheel portion, spaced therefrom a selected distance; a first connecting arm portion extending substantially radially inwardly from said annular outer wheel portion, having an inner free end and a length which is only a small fraction of said selected distance between said outer wheel portion and said annular hub portion; an arcuate resilient shock absorber portion connected at one end to said inner free end of said first connecting arm portion and extending over an arc of slightly less than 360° substantially parallel to and coaxially with said annular outer wheel portion and located closely adjacent thereto; a second connecting arm portion extending substantially radially outwardly from said annular hub portion, having an outer free end connected to the other end of said arcuate shock absorber portion; and a balancing arm portion extending substantially radially outwardly from said annular hub portion in a direction substantially opposite to said second connecting arm portion to substantially balance out the eccentric weight of said connecting arm portions and said arcuate shock absorber portion, whereby the length of said arcuate resilient shock absorber portion is only slightly smaller than said circumferential length of said annular outer wheel portion so that the great length of said arcuate resilient shock absorber portion ensures sufficient resiliency of the same despite the one piece construction of said one piece balance wheel.

3. For use in a timepiece, a one piece balance wheel composed of an annular outer wheel portion having an axis of turning, a cross-sectional area of a selected size and a predetermined peripheral length; an annular hub portion of substantially smaller peripheral length than said predetermined peripheral length and arranged coaxially and substantially in the same plane as said annular outer wheel portion, spaced therefrom a selected distance; a first connecting arm portion extending substantially radially inwardly from said annular outer wheel portion, having an inner free end and a length which is only a small fraction of said selected distance between said outer wheel portion and said annular hub portion; an arcuate resilient shock absorber portion having a cross-sectional area of a size substantially smaller than said selected size of the cross-sectional area of said annular outer wheel portion, connected at one end to said inner free end of said first connecting arm portion and extending over an arc of slightly less than 360° substantially parallel to and coaxially with said annular outer wheel portion and located closely adjacent thereto; a second connecting arm portion spaced circumferentially from said first connecting arm portion, extending substantially radially outwardly from said annular hub portion, having an outer free end connected to the other end of said arcuate shock absorber portion; and a balancing arm portion extending substantially radially outwardly from said annular hub portion in a direction substantially opposite to said second connecting arm portion to substantially balance out the eccentric weight of said connecting arm portions and said arcuate shock absorber portion, whereby the length of said arcuate resilient shock absorber portion is only slightly smaller than said circumferential length of said annular outer wheel portion so that the great length of said arcuate resilient shock absorber portion ensures sufficient resiliency of the same despite the one piece construction of said one piece balance wheel.

References Cited in the file of this patent
UNITED STATES PATENTS

| | | |
|---|---|---|
| 1,951,995 | Schaad | Mar. 20, 1934 |
| 2,663,139 | Fink | Dec. 22, 1953 |
| 2,880,570 | Favret et al. | Apr. 7, 1959 |
| 2,894,367 | Gingrich | July 14, 1959 |

FOREIGN PATENTS

| | | |
|---|---|---|
| 102,816 | Germany | Apr. 17, 1899 |